United States Patent [19]

Berkey

[11] 4,019,660
[45] Apr. 26, 1977

[54] INSTANT COFFEE DISPENSER

[76] Inventor: R. Scott Berkey, 11425 Miller Road, Whittier, Calif. 90604

[22] Filed: Dec. 29, 1975

[21] Appl. No.: 644,767

[52] U.S. Cl. .............................. 222/304; 222/339
[51] Int. Cl.² ...................................... G01F 11/26
[58] Field of Search .......... 222/427, 444, 430, 456, 222/434, 435, 439, 440, 452, 315, 339, 354, 297–304, 300, 339

[56] References Cited

UNITED STATES PATENTS

| 642,534 | 1/1900 | Sester | 222/300 |
|---|---|---|---|
| 920,656 | 5/1909 | Ross | 222/303 |
| 934,182 | 9/1909 | Jopling | 222/339 |
| 1,885,201 | 11/1932 | Holley | 222/304 X |

Primary Examiner—Stanley H. Tollberg
Assistant Examiner—Norman L. Stack, Jr,
Attorney, Agent, or Firm—Edgar W. Averill, Jr.

[57] ABSTRACT

A device for dispensing a pre-measured amount of a particulate solid such as instant coffee utilizing a rotatable hollow cylinder having an opening in the side wall extending radially for between 45° and 135° along a portion of the cylinder. The cylinder is positioned in a jar attachment member which holds an inverted jar above the hollow cylinder. As the cylinder is rotated, the hollow opening therein is filled and when the opening is oriented downwardly the particulate matter is ejected. Piston means are positioned within the hollow cylinder to adjust the volume of the opening to permit pre-measuring the amount which will be released.

4 Claims, 6 Drawing Figures

U.S. Patent  April 26, 1977  4,019,660
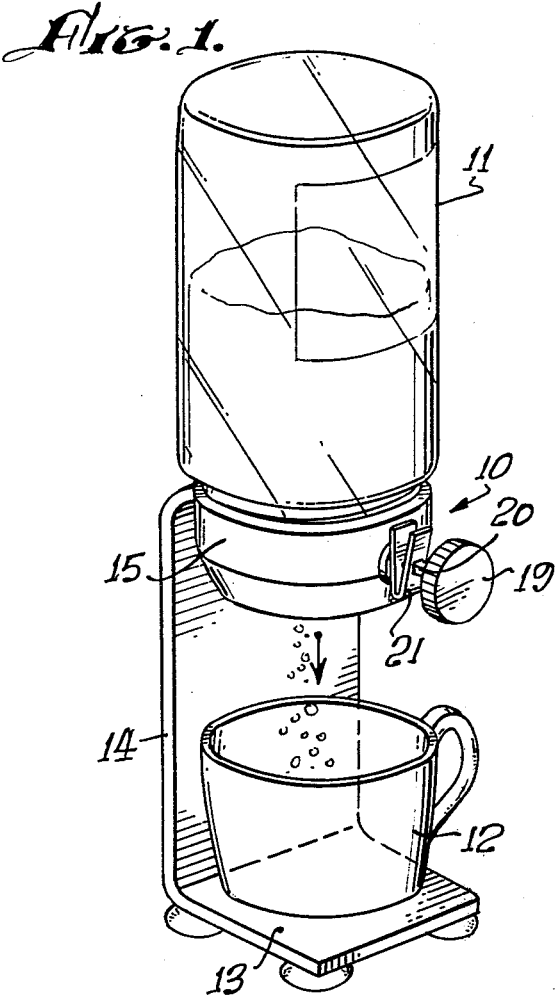
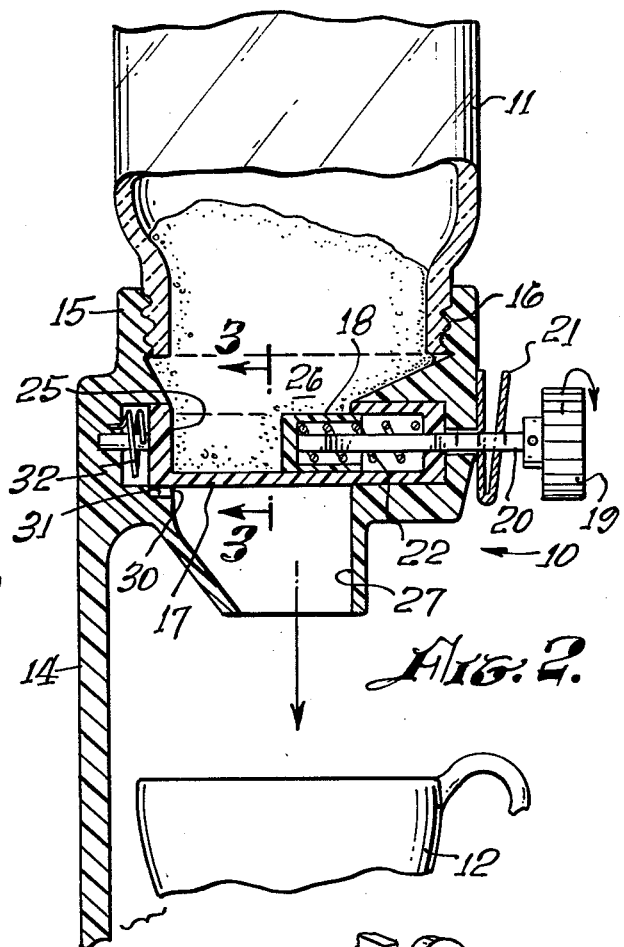
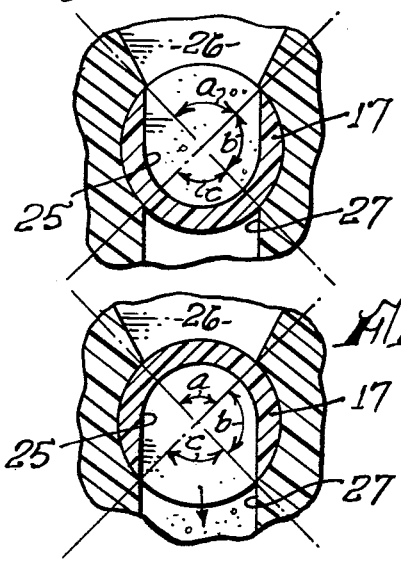
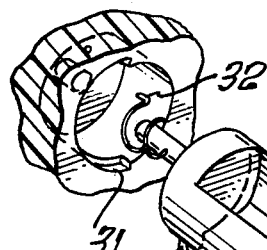
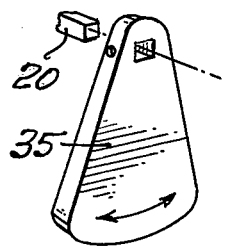
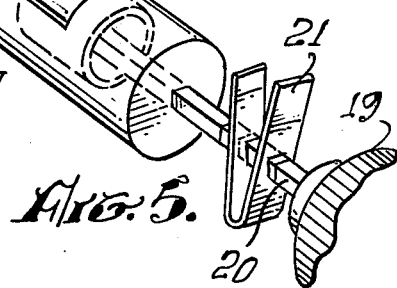

INSTANT COFFEE DISPENSER

BACKGROUND OF THE DISCLOSURE

The field of the invention is food dispensing devices and more particularly relates to devices for dispensing particulate solids such as instant coffee or other powdered instant foods. Pre-measured amounts of instant coffee have been supplied in foil pouches and other small containers but by far the most common method of measuring such products is the use of a teaspoon or other measuring container.

Foil pouches may be filled with a pre-measured amount of the appropriate powder but do not permit the user to vary the amount of powder to suit his taste. The use of a teaspoon has the opposite difficulty—that is, no two heaping teaspoonfuls are alike since the amount of excess or shortage differs with each dip. If the user wishes to make a level teaspoon then he is once again limited to a predetermined amount.

SUMMARY OF THE INVENTION

It is thus a primary object of the present invention to provide a solid particle dispensing device which will permit adjustment in the volume of solid material dispensed.

It is another important object of the present invention to provide an instant coffee dispensing device which may be adjusted to dispense predetermined amounts of instant coffee.

The present invention is for a device for dispensing a pre-measured amount of instant coffee or other solid particulated substance. The device has a base which may be free standing or have means for being affixed to a wall or shelf. A jar attachment member is affixed to the base and has a threaded portion or other clamp member to hold a jar of instant coffee in an inverted position. A measuring cylinder is positioned below the jar attachment member and is held in a cylindrical opening having an inside diameter only slightly larger than the outside diameter of the measuring cylinder so that the instant coffee does not flow around the outside of the cylinder but instead is held in the jar until the cylinder is rotated. A piston is positioned within the hollow cylindrical member and is longitudinally adjustable to increase or decrease the size of the cavity in the cylinder. As the cylinder is positioned in an upward orientation, instant coffee fills the adjustable opening in the cylinder, and when the cylinder has been rotated 180°, the instant coffee is ejected or falls from the opening into a cup placed below the member. Means for adjusting the piston to determine the interior volume of the measuring cylinder are provided. Biasing means to return the cylinder to its original rotational orientation facilitate the use of the device and such biasing means may comprise a spring or a weighted handle which positions the cylinder by the use of gravity.

BRIEF DESCRIPTION OF THE DRAWINGS

FIG. 1 is a perspective view of the dispensing device of the present invention together with an associated jar and cup.

FIG. 2 is an enlarged fragmentary side elevation partly broken away of the dispensing device of FIG. 1.

FIG. 3 is a cross-sectional view taken along line 3—3 of FIG. 2.

FIG. 4 is a cross-sectional view analogous to FIG. 3 except the measuring cylinder is shown in an inverted position.

FIG. 5 is an enlarged perspective view of the dispensing cylinder of the device of FIG. 1.

FIG. 6 is a perspective view of an alternate configuration of the handle of the device of FIG. 1.

DESCRIPTION OF THE PREFERRED EMBODIMENTS

The dispensing device of the present invention is shown in perspective view in FIG. 1 and indicated generally by reference character 10. A jar of instant coffee or other solid particulate material is indicated by reference character 11 and is held by the dispensing device 10. A cup 12 is placed on a platform 13 of base 14. As shown most clearly in FIG. 2, the base 14 supports a jar-holding device 15 which comprises a threaded portion 16 of the device. Typically, the threads are adapted to fit a common size of instant coffee jar. While the present invention is discussed largely with regard to instant coffee, it is, of course, useful for other solid materials such as ground coffee, sugar and the like. The material to be dispensed should be relatively free flowing, the particle size and flow characteristics should not be such as to readily leak around a somewhat loosely fitting cylinder and the particles should not be so large as to prevent movement or turning of the measuring cylinder.

The measuring cylinder 17 is positioned below the jar attachment means and will be described more fully below. A piston 18 is positioned within the measuring cylinder 17 and is movable inwardly or outwardly along the measuring cylinder by pulling or pushing on knob 19 which is attached to piston 18. A spring clip 21 serves to hold piston 18 in a fixed position and spring 22 urges the piston towards a closed position. The details of this feature of the present invention are discussed below.

Turning now to FIG. 3, the measuring cylinder 17 is shown with the compartment opening positioned upwardly so that the compartment, indicated generally by reference character 25, is filled with instant coffee, indicated by reference character 26. As shown in FIG. 4, the cylinder has been rotated 180° and the compartment is facing downwardly. The instant coffee has fallen out of the compartment 25 through chute 27 and thence into the cup.

The radial opening of compartment 25 is an important aspect of the present invention. The angle as measured from the axis of the measuring cylinder to the outer surface of the measuring cylinder is indicated by reference character "$a$". That portion of the jar attachment means which surrounds and supports one side of cylinder 17 is indicated by reference character $b$. The opening to the cute is indicated by reference character $c$ and the angular opening on the other side of the cylinder wall is indicated by the reference character $d$. Angle $a$ should be no larger than angle $b$ for cylinders which rotate in a clockwise direction. As shown in FIG. 3, one side of the wall of the jar attachment means which holds cylinder 17 serves to close off compartment 25 before any portion of compartment 25 reaches the chute 27.

It is apparent that the device could be manufactured in a manner so that the measuring cylinder could turn only a limited amount. For instance, if the measuring cylinder turned only in a clockwise direction as shown in FIG. 3, the size of angle d would be relatively unimportant and it would only be the relative amounts of angles a, b, and c that would determine the effectiveness of the device. Angle c should be sufficiently large to permit all the coffee within the compartment to fall freely therefrom but otherwise may be most any angle. In the event of limited rotation, angle d merely needs to be large enough to provide a stop to prevent coffee from flowing around the outside of the cylinder. Preferably, the cylinder should be supported in part by the use of the side wall along angle d although the actual support could alternatively be provided by the end portions of the cylinder. Therefore, the relative size of angles a and b is important and it has been found that angles between 45° and 135° are appropriate for angle a and angle b. Angle a should be less than angle b and they need not be equal. When angle a and angle b are between 45° and 135°, angle c can be large enough for easy dispensing. Furthermore, angles b and d are large enough to prevent any significant leakage of material around the outside of the cylinder.

Turning now to FIG. 5, one means of limited the rotation of the measuring cylinder 17 is shown where stop 30 rides in slot 31 and return spring 32 tends to urge compartment 25 into an upward orientation as shown in FIG. 5. As knob 19 is turned, the compartment moves in a clockwise direction, as viewed from the knob, and moves to a downward orientation as shown in FIG. 4 to permit the material in the compartment to fall into chute 27.

A piston 18 is positioned within compartment 25 and is movable longitudinally with respect to cylinder 17. A spring clip 2 prevents further inward movement of knob 19 and spring 22 tends to urge knob 19 in an inward direction. Thus, the setting of spring clip 21 sets piston 18 in a predetermined fixed position which, in turn, fixed the volumes which can be held in compartment 25. To change the size of compartment 25, the spring clip 21 is simply depressed and knob 19 is pulled outwardly or pushed inwardly to increase or decrease the size of compartment 25. Other means such as a threaded knob on rod 20 could be used for the same purpose as could other holding means. Spring 22 is only necessary for holding means which prevent only inward movement. If the holding device provides a positive grip in either direction no spring is required.

Rod 20 is shown in the drawings as a square rod so that it is it is fixed rotationally with respect to measuring cylinder 17. The same result can be brought about by a round rod with a key-way pin or other device such as a slot, which permits longitudinal movement of the rod within the measuring cylinder but prevents rotational movement of these two members.

An laternate method for turning compartment 25 to its original position is the use of a weighted knob such as indicated by reference character 35 in FIG. 6. Weighted knob 35 should be of sufficient weight so that the cylinder is moved in the desired position and should preferably be cast from metal. Furthermore, by substituting a weighted knob 35 for the return spring 32, it is possible to eliminate stop 30 and slot 31 since the knob will always tend to return to its downward stable configuration.

Although the stable configuration of the measuring cylinder is shown in the drawings to be in the upward position, it could be designed to be stable in a downward configuration. The device would nonetheless serve its desired function in that no substance would be dispersed when the compartment 25 was positioned downwardly. One measure would be dispensed by turning the compartment to an upward position, allowing it to fill and then rotating back to its stable downward configuration to dispense one measure.

A particularly useful device results from the use of a base having a platform such as that shown in FIG. 1 which provides a platform for the cup or other container. A plurality of suction cups 36 help to hold the device in a stable place on a counter top. It is advantageous to have the device readily liftable for purposes of inserting a new jar of coffee or other dispensed product. In this manner, the jar can be held in an upright position until the jar attachment means are screwed or otherwise affixed to the jar. Only after this is the jar inverted and thus there is no spilling when changing jars.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A device for dispensing a pre-measured amount of a particulate solid, said device comprising:
    a base member;
    jar attachment means affixed to said base member for holding a jar of particulate solid in an inverted position said attachment means having a generally horizontal cylindrical opening for holding a dispensing cylinder and further having a spout for directing solid from the device;
    a dispensing member having a partially hollow cylindrical body positioned in the cylindrical opening of said jar attachment means, said cylindrical body having a cavity with piston means therein, said piston means being connected to an arm extending outwardly of the jar attachment means, and positioning means affixed to said arm for longitudinally affixing said piston within said cavity and an opening the ends of which extend over no more than 180° as measured from the longitudinal axis of said cylindrical body, said opening being located within the side wall of the cylindrical body whereby the axial rotation of said cylindrical body causes the cavity to fill when said opening is in an upward orientation and to empty when it is in a downward position; and
    biasing means urging said piston toward a closed configuration.

2. The device of claim 1 wherein said opening is about 90°.

3. The device of claim 1 wherein said means to return said cylindrical body to its original position comprises a weighted handle.

4. The device of claim 1 wherein said positioning means comprise a spring clip.

* * * * *